(12) United States Patent
Zhang et al.

(10) Patent No.: US 12,607,814 B2
(45) Date of Patent: Apr. 21, 2026

(54) OPTICAL TRANSCEIVER WITH SEESAW RELEASE MECHANISM

(71) Applicant: Global Technology Inc., Ningbo (CN)

(72) Inventors: Xin Zhang, Ningbo (CN); Qilin Hong, Ningbo (CN); Kejun Chen, Ningbo (CN); Taotao Ye, Ningbo (CN)

(73) Assignee: Global Technology Inc., Ningbo (CN)

( * ) Notice: Subject to any disclaimer, the term of this patent is extended or adjusted under 35 U.S.C. 154(b) by 249 days.

(21) Appl. No.: 18/125,979

(22) Filed: Mar. 24, 2023

(65) Prior Publication Data

US 2024/0094487 A1 Mar. 21, 2024

(30) Foreign Application Priority Data

Sep. 21, 2022 (CN) .......................... 202211149003.2

(51) Int. Cl.
*G02B 6/42* (2006.01)
*G02B 6/35* (2006.01)

(52) U.S. Cl.
CPC ............. *G02B 6/426* (2013.01); *G02B 6/358* (2013.01); *G02B 6/4261* (2013.01)

(58) Field of Classification Search
CPC ....... G02B 6/426; G02B 6/358; G02B 6/4261
See application file for complete search history.

(56) References Cited

U.S. PATENT DOCUMENTS

| | | | | | |
|---|---|---|---|---|---|
| 7,347,711 | B1 * | 3/2008 | Bianchini | ............ | G02B 6/4201 439/357 |
| 7,841,779 | B1 * | 11/2010 | Bianchini | ............ | G02B 6/4261 385/88 |
| 2009/0176401 | A1 * | 7/2009 | Gu | ................... | H01R 13/62933 361/728 |
| 2009/0274468 | A1 * | 11/2009 | Zhang | ................. | G02B 6/4201 398/139 |
| 2010/0067199 | A1 * | 3/2010 | Chen | ................... | G02B 6/4201 361/747 |
| 2015/0188635 | A1 * | 7/2015 | Yeh | ....................... | H04B 10/40 398/135 |

* cited by examiner

*Primary Examiner* — Thomas A Hollweg
*Assistant Examiner* — Marc E Manheim
(74) *Attorney, Agent, or Firm* — Grossman Tucker Perreault & Pfleger, PLLC

(57) ABSTRACT

An optical transceiver includes a housing, a release component, a bottom cover and a handle. The housing includes a terminal portion and a first engagement component connected to each other. The first engagement component detachably engages a second engagement component of an elastic arm of a cage. The release component is in an accommodation space of the terminal portion. The bottom cover includes a main portion and an elastic component connected to each other. The main portion is fixed to the terminal portion. The elastic component extends from the main portion into the accommodation space and exerts an elastic force on the release component so that the release component is positioned at or moved to an original position. The handle is movably disposed on the terminal portion for pushing the release component so as to detach the second engagement component from the first engagement component.

9 Claims, 12 Drawing Sheets

OPTICAL TRANSCEIVER WITH SEESAW RELEASE MECHANISM

CROSS-REFERENCE TO RELATED APPLICATIONS

This non-provisional application claims priority under 35 U.S.C. § 119(a) on Patent Application No(s). 202211149003.2 filed in China on Sep. 21, 2022, the entire contents of which are hereby incorporated by reference.

TECHNICAL FIELD

This disclosure relates to an optical transceiver, more particularly, to a pluggable optical transceiver with seesaw release mechanism.

BACKGROUND

Optical transceivers are generally installed in electronic communication facilities in modern high-speed communication networks. In order to make flexible the design of an electronic communication facility and less burdensome the maintenance of the same, an optical transceiver is inserted in a pluggable fashion into a corresponding cage. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others including QSFP28 and QSFP-DD (double density) at different communication rates have been made available.

Generally, as to an optical transceiver, a fastening structure is provided for securely fixing the optical transceiver to the cage in order to prevent the optical transceiver from disruption of transmission signals. In addition, a release mechanism is required to operate with the fastening structure for releasing the same optical transceiver from the cage smoothly when necessary.

SUMMARY

According to one or more embodiment of this disclosure, an optical transceiver, configured to be removably inserted into a cage, includes a housing, a release component, a bottom cover and a handle. The housing includes a terminal portion and a first engagement component. The first engagement component is connected to the terminal portion. The first engagement component is configured to be detachably engaged with a second engagement component of an elastic arm of the cage. The release component is located in an accommodation space of the terminal portion and at either an original position or a release position. The bottom cover includes a main portion and an elastic component. The main portion is fixed to the terminal portion. The elastic component is connected to the main portion and extends from the main portion into the accommodation space. The elastic component constantly exerts an elastic force on the release component so that the release component is positioned at the original position or moved to the original position. The handle is movably disposed on the terminal portion of the housing. In addition, the handle pushes the release component to move to the release position, and thereby the release component pushes the elastic arm of the cage to move so as to detach the second engagement component of the elastic arm from the first engagement component of the housing.

According to one or more embodiment of this disclosure, an optical transceiver, configured to be removably inserted into a cage, includes a housing, a seesaw component, an elastic component and a handle. The housing includes a terminal portion and a first engagement component. The first engagement component is connected to the terminal portion. The first engagement component is configured to be detachably engaged with a second engagement component of an elastic arm of the cage. The seesaw component is rotatably disposed on the terminal portion of the housing, and the seesaw component is at either an original position or a release position. The elastic component is disposed on the terminal portion of the housing. The elastic component constantly exerts an elastic force on the seesaw component so that the seesaw component is positioned at the original position or moved to the original position. The handle is rotatably disposed on the terminal portion of the housing. When the handle is driven by an external force to rotate relative to the terminal portion, the handle pushes the seesaw component to rotate to the release position, and thereby the seesaw component pushes the elastic arm of the cage to move so as to detach the second engagement component of the elastic arm from the first engagement component of the housing. The terminal portion of the housing includes a bottom surface and an assembling recess part. The assembling recess part includes a release section, a first coupling section and a second coupling section. The release section of the assembling recess part is recessed from the bottom surface. The first coupling section and the second coupling section are respectively connected to the release section, and an extension direction of the first coupling section and an extension direction of the second coupling section are different from an extension direction of the release section. A shaft part of the seesaw component is rotatably disposed in the first coupling section, and a rotatably coupling part of the handle is rotatably disposed in the second coupling section.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Aspects and advantages of the invention will become apparent from the following detailed descriptions with the accompanying drawings. For purposes of explanation, one or more specific embodiments are given to provide a thorough understanding of the invention, and which are described in sufficient detail to enable one skilled in the art to practice the described embodiments. It should be understood that the following descriptions are not intended to limit the embodiments to one specific embodiment. On the contrary, it is intended to cover alternatives, modifications, and equivalents as can be included within the spirit and scope of the described embodiments as defined by the appended claims.

As to a conventional optical transceiver, a release mechanism of the optical transceiver may include a plurality of components, such as a seesaw component, a plate spring, and a handle. As such, multiple steps are required for installation of those components onto a housing before they are fastened to somewhere such as a bottom cover. The conventional release mechanism is complex in structure and contains a relatively large number of components, rendering more difficult installation and removal of the components and challenging manufacturing cost reduction.

Figure 1:
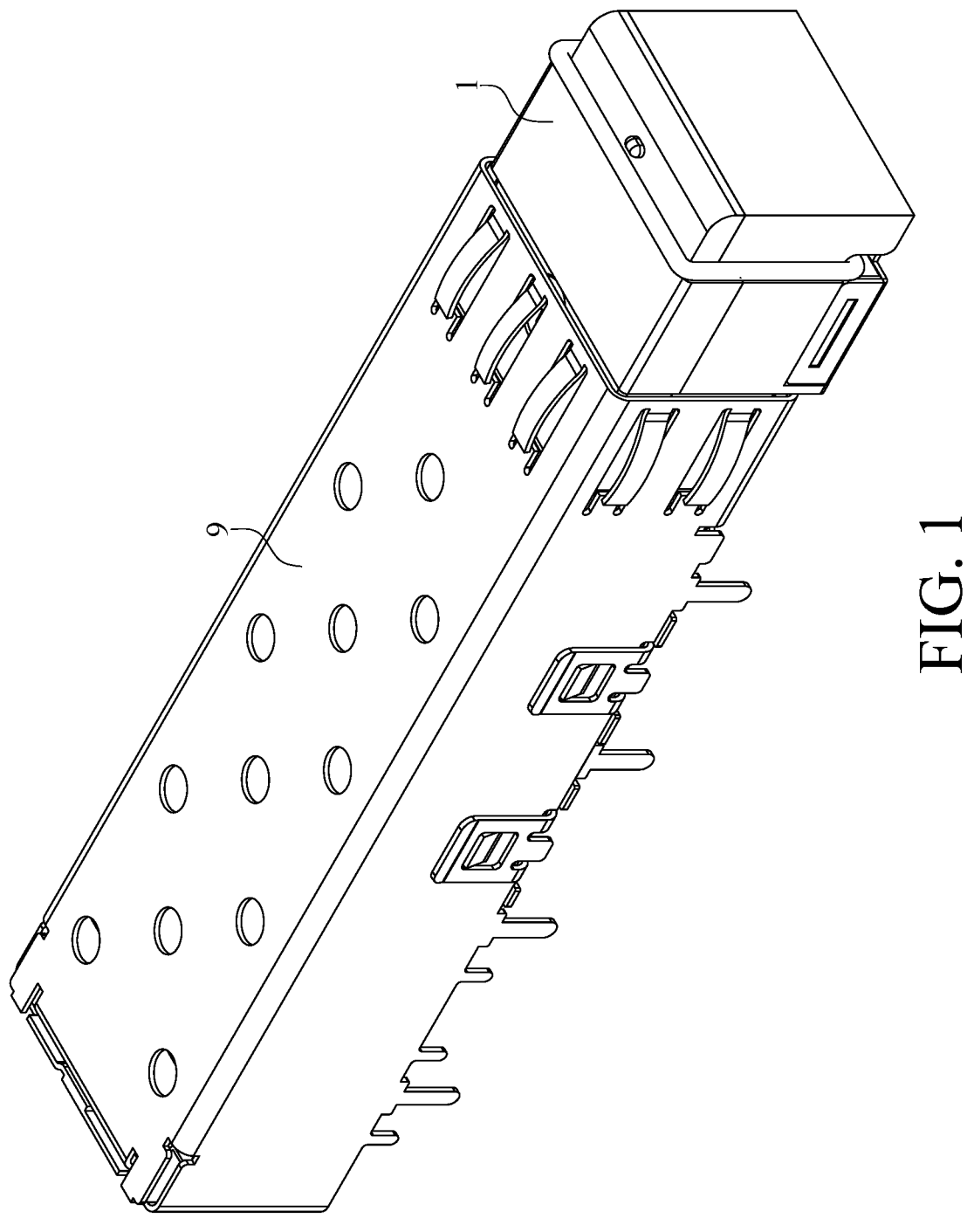
FIG. 1 is a perspective view of an optical transceiver according to a first embodiment of the present disclosure.
Figure 2:
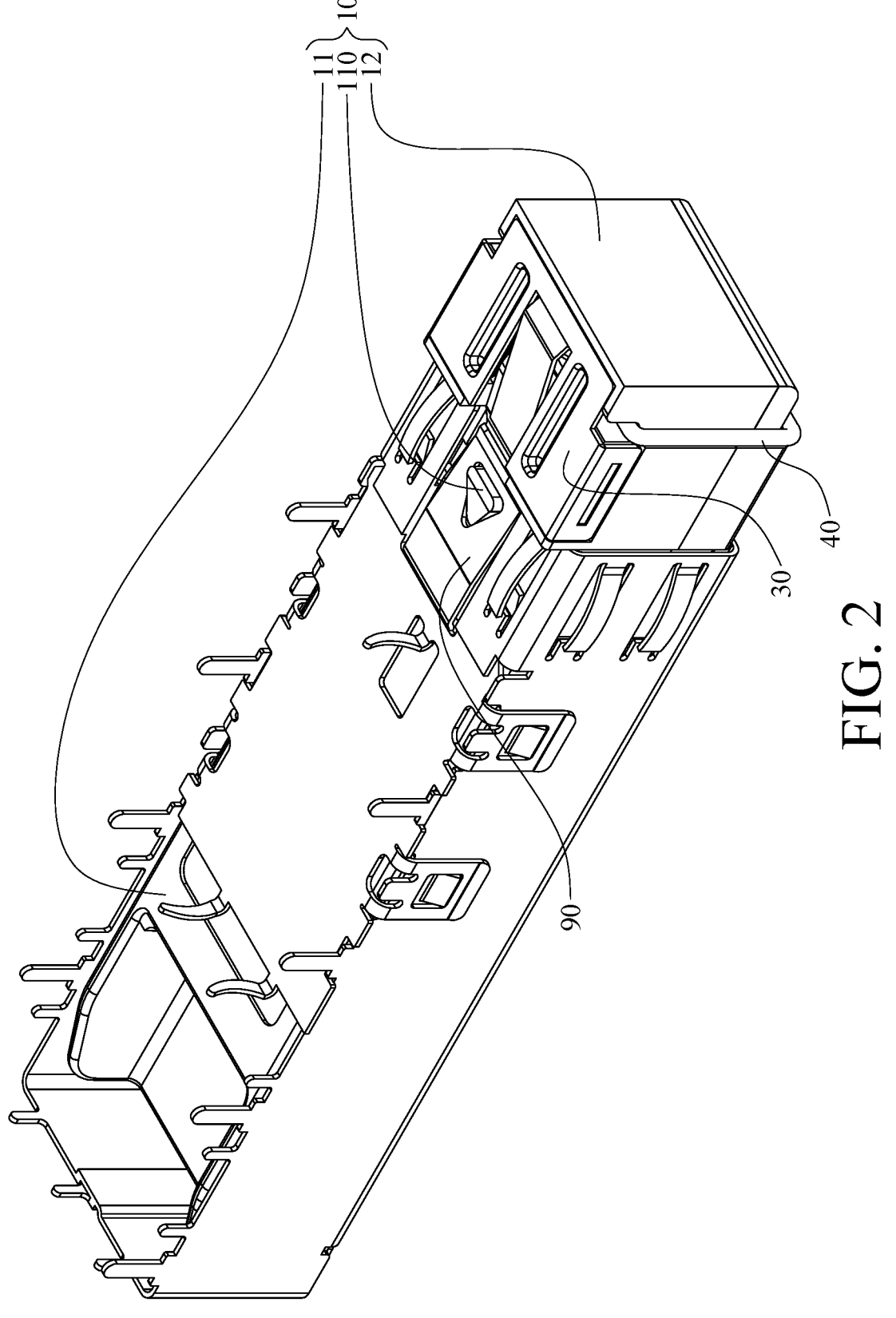
FIG. 2 is another perspective view of the optical transceiver in FIG. 1.
Figure 3:
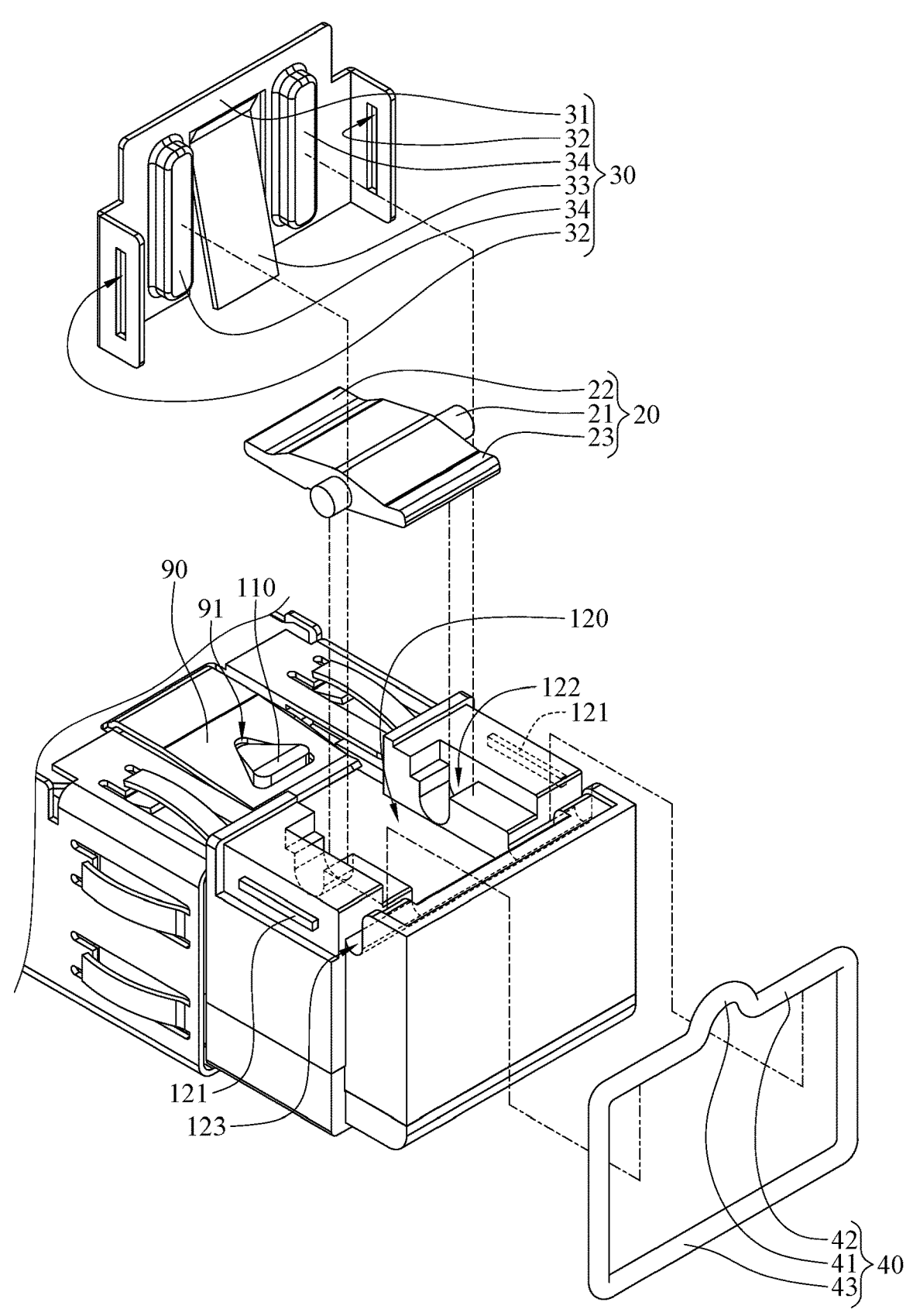
FIG. 3 is a partial and exploded view of the optical transceiver in FIG. 2.
Figure 4:
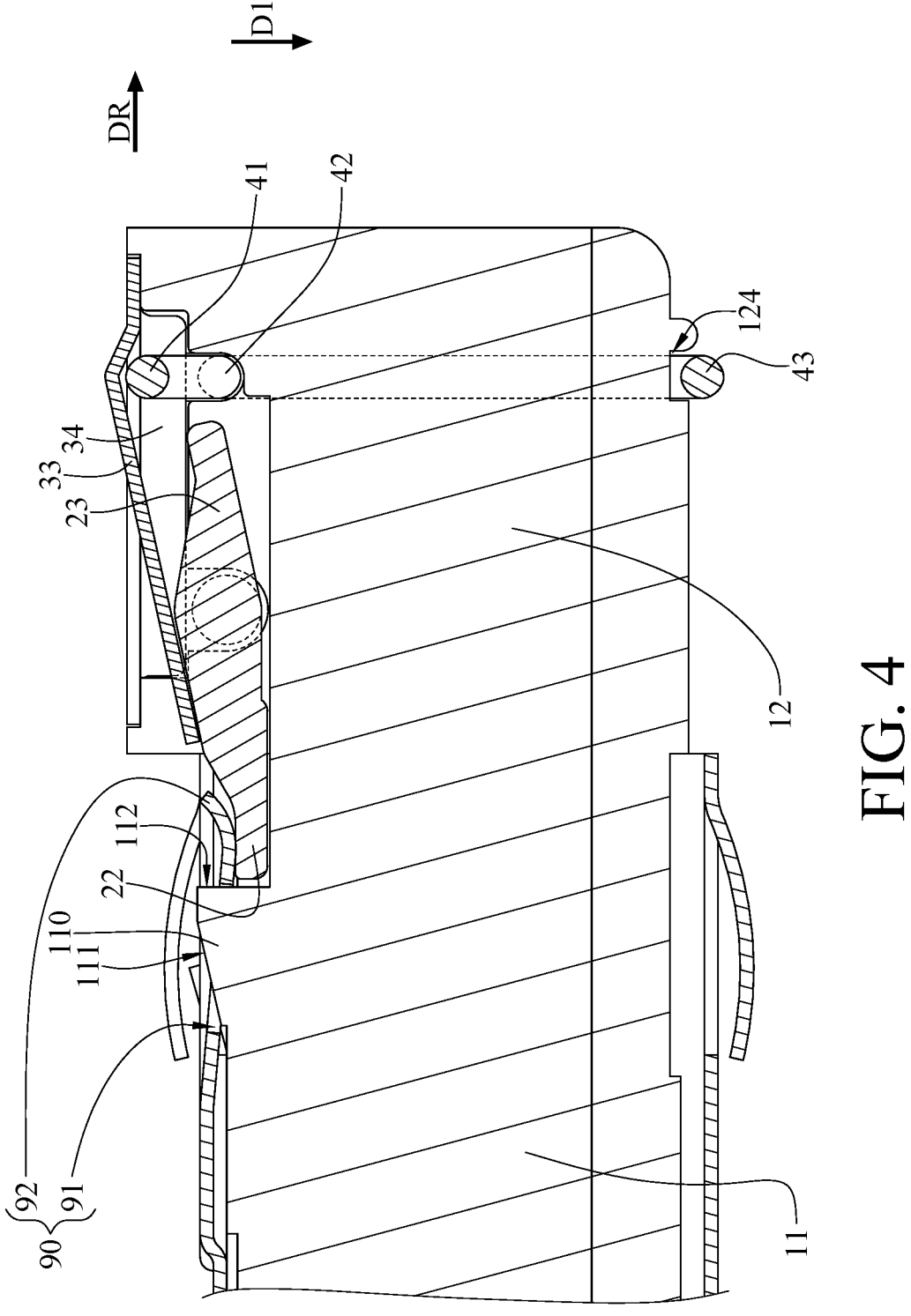
FIG. 4 is a partial cross-sectional view of the optical transceiver in FIG. 2.

Please refer to FIG. 1 to FIG. 4. FIG. 1 is a perspective view of an optical transceiver according to a first embodiment of the present disclosure, FIG. 2 is another perspective view of the optical transceiver in FIG. 1, FIG. 3 is a partial and exploded view of the optical transceiver in FIG. 2, and FIG. 4 is a partial cross-sectional view of the optical transceiver in FIG. 2.

In this embodiment, an optical transceiver 1 is provided. The optical transceiver 1 is configured to be removably inserted into a cage 9. The optical transceiver 1 may be implemented in different form factors, such as a small form-factor pluggable (SFP) transceiver, a small form-factor pluggable double-density (SFP-DD) transceiver and a dual small form-factor pluggable (DSFP) transceiver. The optical transceiver 1 may include a housing 10, a release component 20, a bottom cover 30 and a handle 40.

The housing 10 may include an insertion portion 11 and a terminal portion 12 connected to each other. In this embodiment, the housing 10 may be configured to accommodate optical-electrical converting circuit (not shown in the drawings) and any electrical or optical components required for performing the corresponding optical-electrical conversion.

The insertion portion 11 may be configured to be inserted into the cage 9 in a pluggable manner. The housing 10 may include a first engagement component 110, and the first engagement component 110 may be connected to the terminal portion 12. The first engagement component 110 may be configured to be detachably engaged with a second engagement component 91 of an elastic arm 90 of the cage 9. In this embodiment, the first engagement component 110 of the housing 10 may be an engagement protrusion, and the second engagement component 91 of the elastic arm 90 of the cage 9 may be an engagement recess. At the time the optical transceiver 1 is inserted into the cage 9, an inclined guiding surface 111 of the first engagement component 110 (for example, the engagement protrusion) may contact and push a guiding portion 92 of the elastic arm 90, such that the elastic arm 90 deforms and moves in a direction away from the first engagement component 110. When the first engagement component 110 corresponds to the second engagement component 91 (for example, the engagement recess), the guiding portion 92 may be separated from the inclined guiding surface 111 and not in contact with the first engagement component 110, and the elastic arm 90 may move back towards the first engagement component 110. As a result, the first engagement component 110 may be engaged with the second engagement component 91. In addition, when the first engagement component 110 is engaged with the second engagement component 91, a blocking surface 112 of the first engagement component 110 may press against a periphery of the second engagement component 91 so as to restrict movement of the optical transceiver 1 in a release direction DR.

The terminal portion 12 of the housing 10 may include an accommodation space 120, a first shaft coupling recess 122, a second shaft coupling recess 123 and an engagement groove 124. The accommodation space 120 may be configured for the release component 20 to be disposed therein. The housing 10 may include two first fastening components 121. The two first fastening components 121 may be respectively formed on two side surfaces of the terminal portion 12 and located on opposite sides of the accommodation space 120. The bottom cover 30 may be installed onto the housing 10 via the first fastening components 121, and detailed component connections will be described later. The first shaft coupling recess 122 and the second shaft coupling recess 123 may be configured for pivot structures of the release component 20 and the handle 40 to be rotatably coupled thereto, respectively. The first shaft coupling recess 122 may be located in the accommodation space 120. The engagement groove 124 may be located at a top surface of the terminal portion 12. The top surface here for example could be opposite to the accommodation space 120. The engagement groove 124 may be configured for the handle 40 to engage therewith so as to fix the handle 40 and restrict rotation of the handle 40 relative to the housing 10. Before pulling out the optical transceiver 1 from the cage 9, an operator may firstly disengage the handle 40 from the engagement groove 124. Detailed operation process of the handle 40 will be described later.

Figure 6:
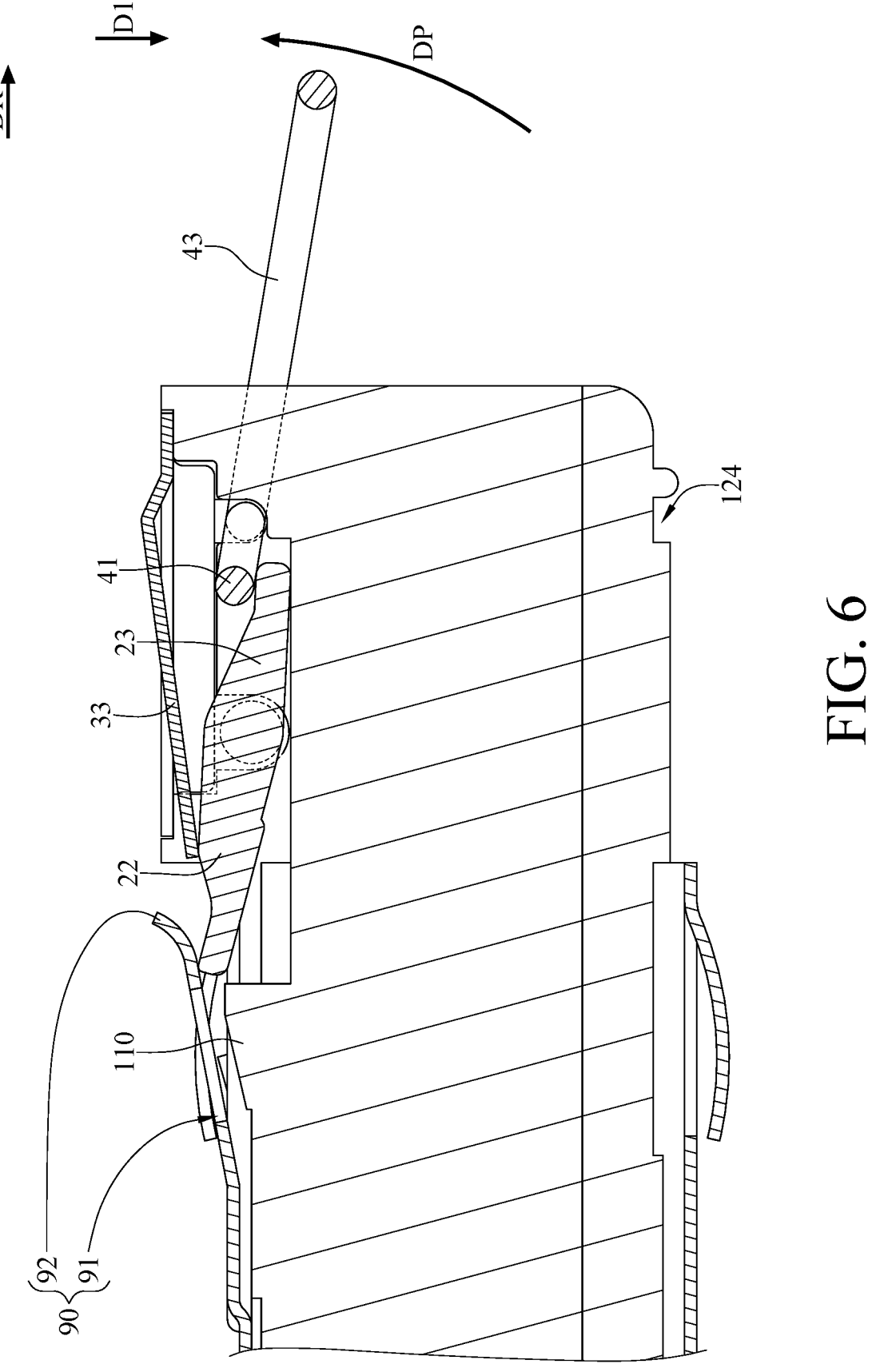
FIG. 6 is a partial cross-sectional view of the optical transceiver in FIG. 2 when a release component of the optical transceiver is located at a release position.

In this embodiment, the release component 20 may be a seesaw component located in the accommodation space 120 of the terminal portion 12 of the housing 10, and the release component 20 may be at either an original position (as shown in FIG. 4) or a release position (as shown in FIG. 6). The release component 20 may include a shaft part 21, a first arm part 22 and a second arm part 23. The shaft part 21 may be rotatably located in the first shaft coupling recess 122 of the terminal portion 12 of the housing 10, effectively rendering the shaft part 21 itself to be rotatably coupled to the housing 10. The first arm part 22 and the second arm part 23 may be connected to opposite sides of the shaft part 21, respectively.

The bottom cover 30 may include a main portion 31, two second fastening components 32, an elastic component 33 and two rib portions 34. The two second fastening components 32 may be respectively disposed on opposite sides of the main portion 31 and respectively engaged with the two first fastening components 121 of the housing 10, allowing for the bottom cover 30 to be fixed to the housing 10.

In this embodiment, the elastic component 33 may be a plate spring connected to the main portion 31 and extending from the main portion 31 into the accommodation space 120, and the elastic component 33 may constantly provide an elastic force on the first arm part 22 of the release component 20 in a first direction D1 so that the release component 20 could be positioned at the original position or moved from the release position to the original position.

The rib portions 34 may protrude from the main portion 31 towards the accommodation space 120, which increases the total structural strength of the bottom cover 30. In addition, the rib portions 34 respectively correspond to two end portions of the shaft part 21 of the release component 20 so as to restrict the shaft part 21 in the first shaft coupling recess 122 of the terminal portion 12 of the housing 10, thereby ensuring normal function of the release mechanism of the optical transceiver 1.

In this embodiment, the main portion 31, the second fastening components 32, the elastic component 33 and the rib portions 34 of the bottom cover 30 may be one-piece formed, for example, via a stamping process. Therefore, by integrally forming the elastic component 33 and/or the second fastening components 32 with the main portion 31 of the bottom cover 30, the number of components constituting a release mechanism of the optical transceiver 1 can be minimized. As such, the optical transceiver 1 has a relatively simple structure, which is favorable for the reduction of component manufacturing costs and improved assembly efficiency with reduced steps of installation and removal of the components.

The handle 40 may be movably disposed on the housing 10. In specific, in this embodiment, the handle 40 may include a contact part 41, a rotatably coupling part 42 and an operation part 43. The rotatably coupling part 42 may be rotatably located in the second shaft coupling recess 123 of the terminal portion 12 of the housing 10, allowing for the rotatably coupling part 42 to be rotatably coupled to the housing 10. The rotatably coupling part 42 may be connected to the contact part 41 and the operation part 43, both of which may respectively extend toward opposite sides of the rotatably coupling part 42 in opposite directions that are perpendicular to an axial direction of the rotatably coupling part 42. The contact part 41 may be located in the accommodation space 120, and the operation part 43 sticks out of the housing 10. As shown in FIG. 3 and FIG. 4, at least a part of the bottom cover 30 may cover the rotatably coupling part 42 of the handle 40 so as to maintain the rotatably coupling part 42 within the second shaft coupling recess 123 of the terminal portion 12 of the housing 10. Specifically, the rib portions 34 of the bottom cover 30 may cover the rotatably coupling part 42 of the handle 40, such that the rotatably coupling part 42 of the handle 40 is prevented from moving out of the second shaft coupling recess 123, thereby ensuring normal function of the release mechanism of the optical transceiver 1.

Figure 5:
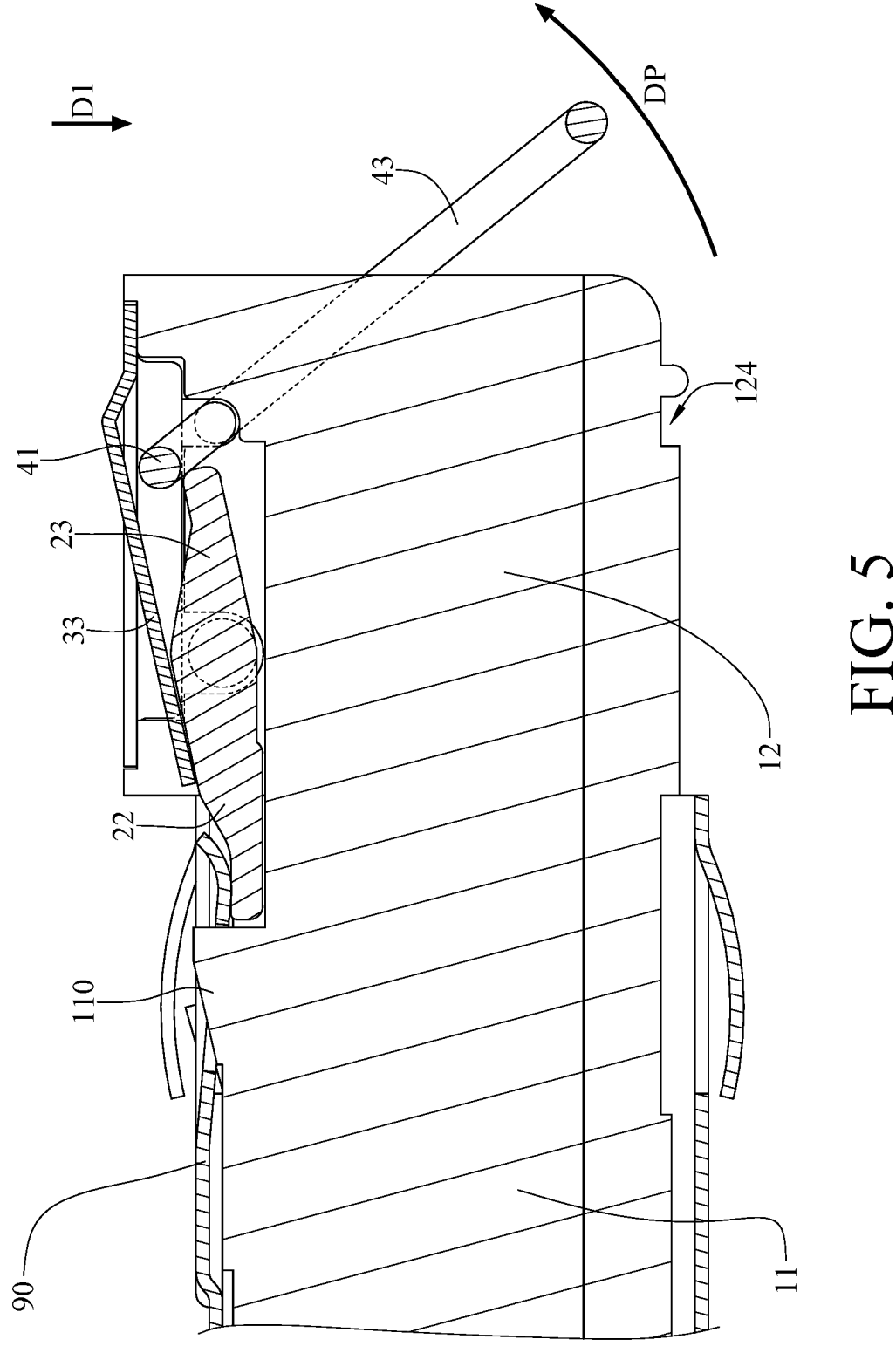
FIG. 5 is a partial cross-sectional view of the optical transceiver in FIG. 2 when an operation part of a handle is separated from an engagement groove of a terminal portion of a housing.

The operator may insert or remove the optical transceiver 1 from the cage 9 using the handle 40. Please refer to FIG. 4 to FIG. 6. FIG. 5 is a partial cross-sectional view of the optical transceiver in FIG. 2 when an operation part of a handle is separated from an engagement groove of a terminal portion of a housing, and FIG. 6 is a partial cross-sectional view of the optical transceiver in FIG. 2 when a release component of the optical transceiver is located at a release position.

When removing the optical transceiver 1 from the cage 9, an operator may firstly pull the operation part 43 of the handle 40 so as to remove the operation part 43 out of the engagement groove 124 of the terminal portion 12 of the housing 10 (as shown in FIG. 5), giving the handle 40 a degree of freedom to rotate relative to the housing 10. Then, the operator may exert a force on the operation part 43 in a rotational direction DP so as to rotate the handle 40 in the rotational direction DP relative to the housing 10 allowing for the contact part 41 of the handle 40 to push the second arm part 23 of the release component 20 in the first direction D1, so as to move the release component 20 to the release position (as shown in FIG. 6). During the rotation of the release component 20, the first arm part 22 moves in a direction opposite to the first direction D1 and pushes the elastic arm 90 of the cage 9 to move so as to detach the second engagement component 91 of the elastic arm 90 from the first engagement component 110 of the housing 10. As a result, the optical transceiver 1 is not engaged with the cage 9. Consequently, the operator may hold the operation part 43 and pull the optical transceiver 1 out of the cage 9 in the release direction DR. After the optical transceiver 1 is pulled out of the cage 9 and the operator releases the handle 40 (e.g., the operator does not exert a force on the operation part 43), the contact part 41 of the handle 40 no longer exerts a force on the first arm part 22 of the release component 20, such that the first arm part 22 is moved in the first direction D1 by an elastic force of the elastic component 33, moving back the release component 20 to the original position from the release position.

It is worth noting that the first engagement component 110 and the second engagement component 91 disclosed in the present disclosure is not limited to a combination of an engagement protrusion with an engagement recess. In other implementations, a first engagement component of a housing may be an engagement recess, and a second engagement component of an elastic arm of a cage may be an engagement protrusion matching the engagement recess.

It is also worth noting that the engagement groove 124 disclosed in the first embodiment may be optional. In other implementations, a terminal portion of a housing may not include an engagement groove for engaging the handle.

It is further worth noting that the release component 20 disclosed in the present disclosure is not limited to a seesaw component. In other implementations, a release component may be a slidable block slidably located in an accommodation space of a terminal portion of a housing, and the slidable block can be pushed to move from an original position to a release position by a handle. The handle is movable relative to the housing and is configured to push an elastic arm of a cage elastic arm to detach a second engagement component from a first engagement component of the housing. Furthermore, when the handle is not exerted by a force, the slidable block is positioned at the original position or moved from the release position to the original position by an elastic component of a bottom cover. In an implementation where a release component is, for example, a slidable block without a shaft part, a terminal portion of a housing may not be provided with a first shaft coupling recess.

It is noting that the first fastening components 121 of the housing 10 and the second fastening components 32 of the bottom cover 30 disclosed in the present disclosure is not limited to a combination of an engagement protrusion with an engagement recess. In other implementations, a first fastening component of a housing may be an engagement recess, and a second fastening component of a bottom cover may be an engagement protrusion matching the engagement recess.

It is noting that the quantity of the first fastening components 121 and the quantity of the second fastening components 32 are not limited by this embodiment. In some implementations, the quantity of the first fastening component and the quantity of the second fastening component each may be one or more than three.

The present disclosure is not limited to the structure and type of the bottom cover 30. In some implementations, a main portion and an elastic component of a bottom cover may be one-piece formed, and a second fastening component and/or a rib portion of the bottom cover may be separate components with respect to the main portion. The second fastening component and/or the rib portion may be fastened to the main portion, for example, via screwing, welding or engaging means. Furthermore, the rib portions 34 of the bottom cover 30 may be optional. In some implementations, a bottom cover may not be provided with a rib portion.

It is noting that the present disclosure is not limited to the handle 40 being rotatably coupled to the housing 10. In other implementations, a handle may be slidably disposed on a housing, a part of the handle is located in an accommodation space of the housing for pushing a release component, and another part of the handle is located out of the housing for an operator to hold and operate. In one implementation where a handle is slidably disposed on a housing and not provided with a rotatably coupling part, a terminal portion of the housing may not be provided with a second shaft coupling recess.

According to the optical transceiver as described in the first embodiment, by integrally forming the elastic component and/or the second fastening component with the main portion of the bottom cover, the number of components constituting a release mechanism of the optical transceiver can be minimized. Therefore, the optical transceiver has a relatively simple structure, which is favorable for the reduction of component manufacturing costs and improved assembly efficiency with reduced steps of installation and removal of the components.

Figure 7:
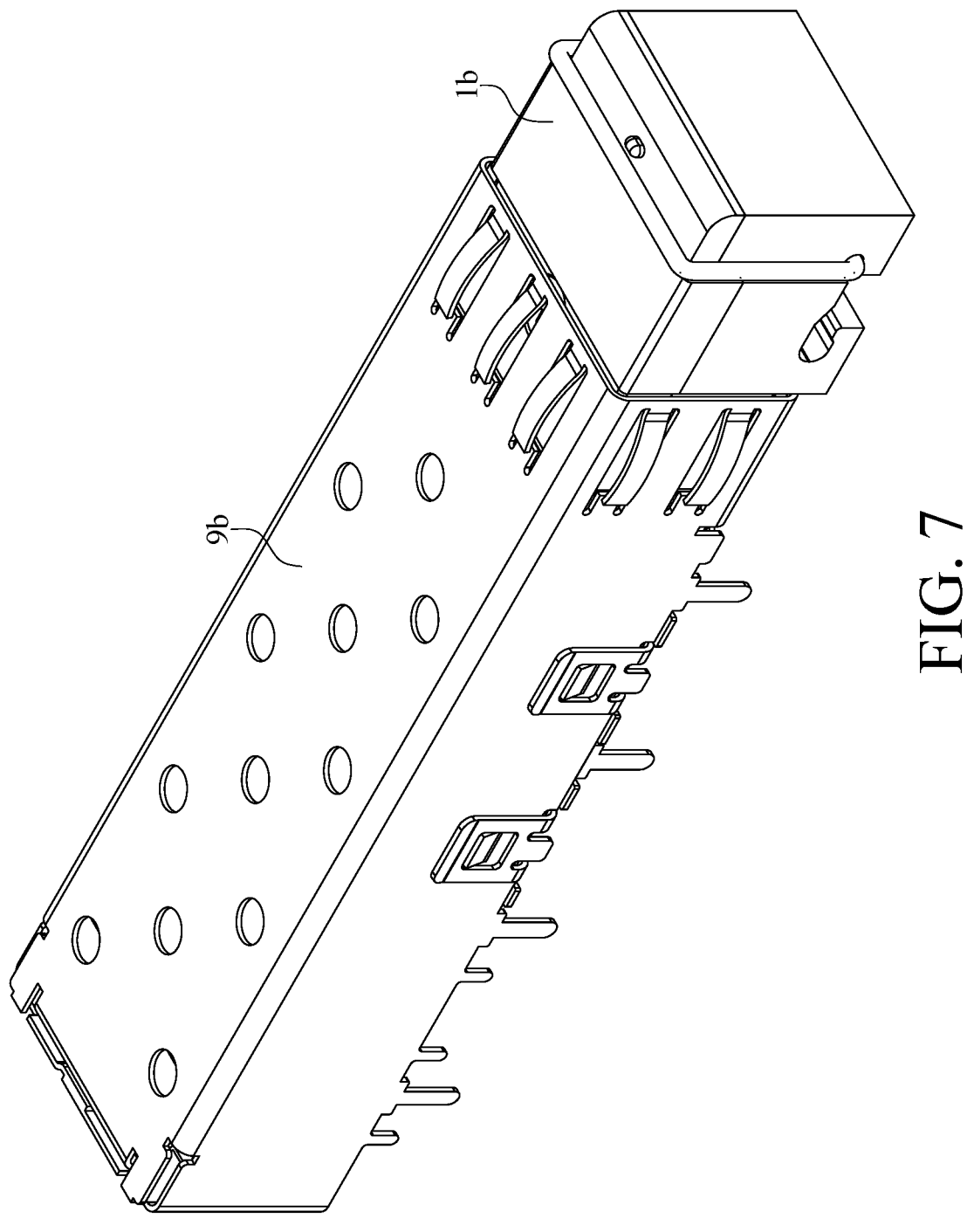
FIG. 7 is a perspective view of an optical transceiver according to a second embodiment of the present disclosure.
Figure 8:
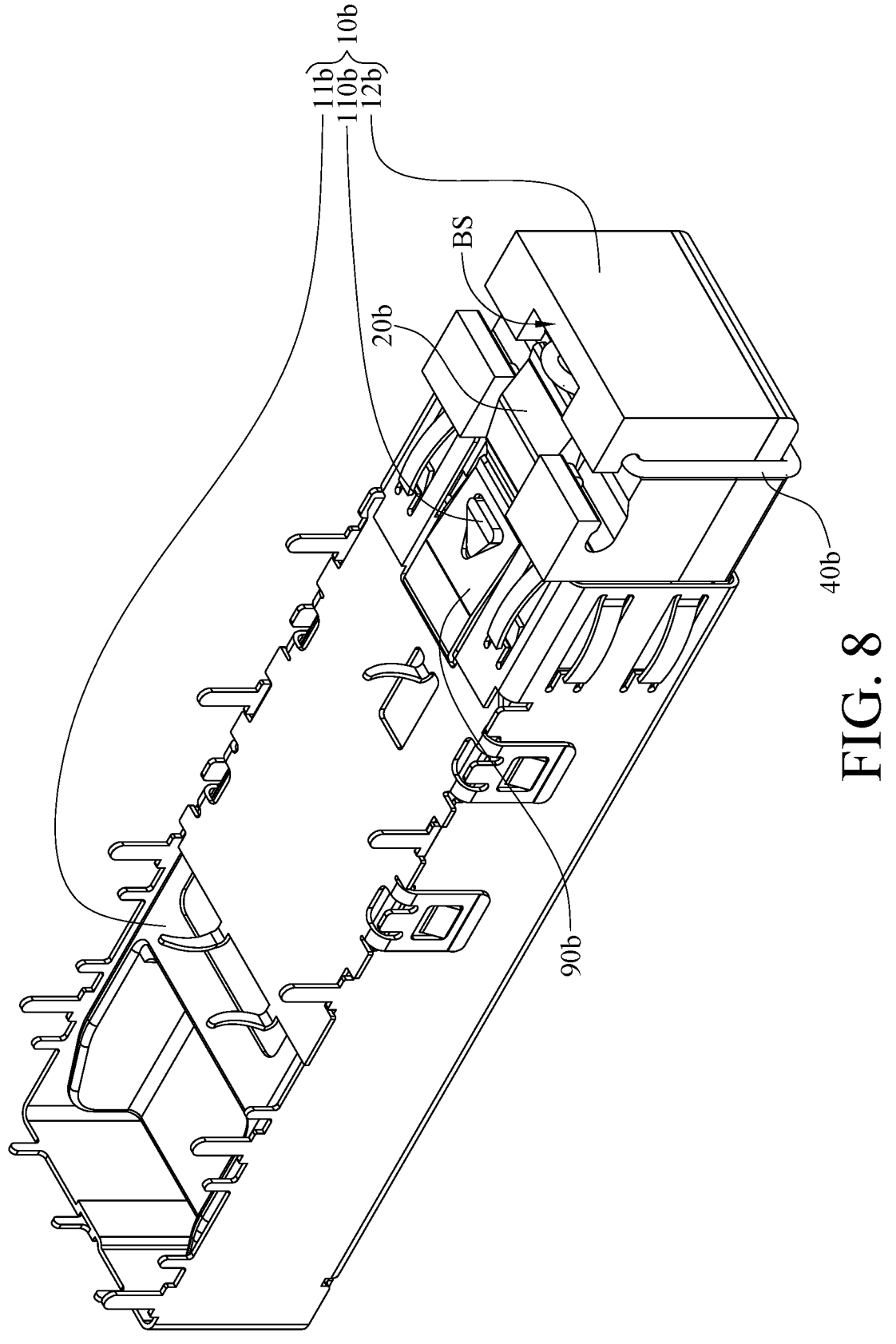
FIG. 8 is another perspective view of the optical transceiver in FIG. 7.
Figure 9:
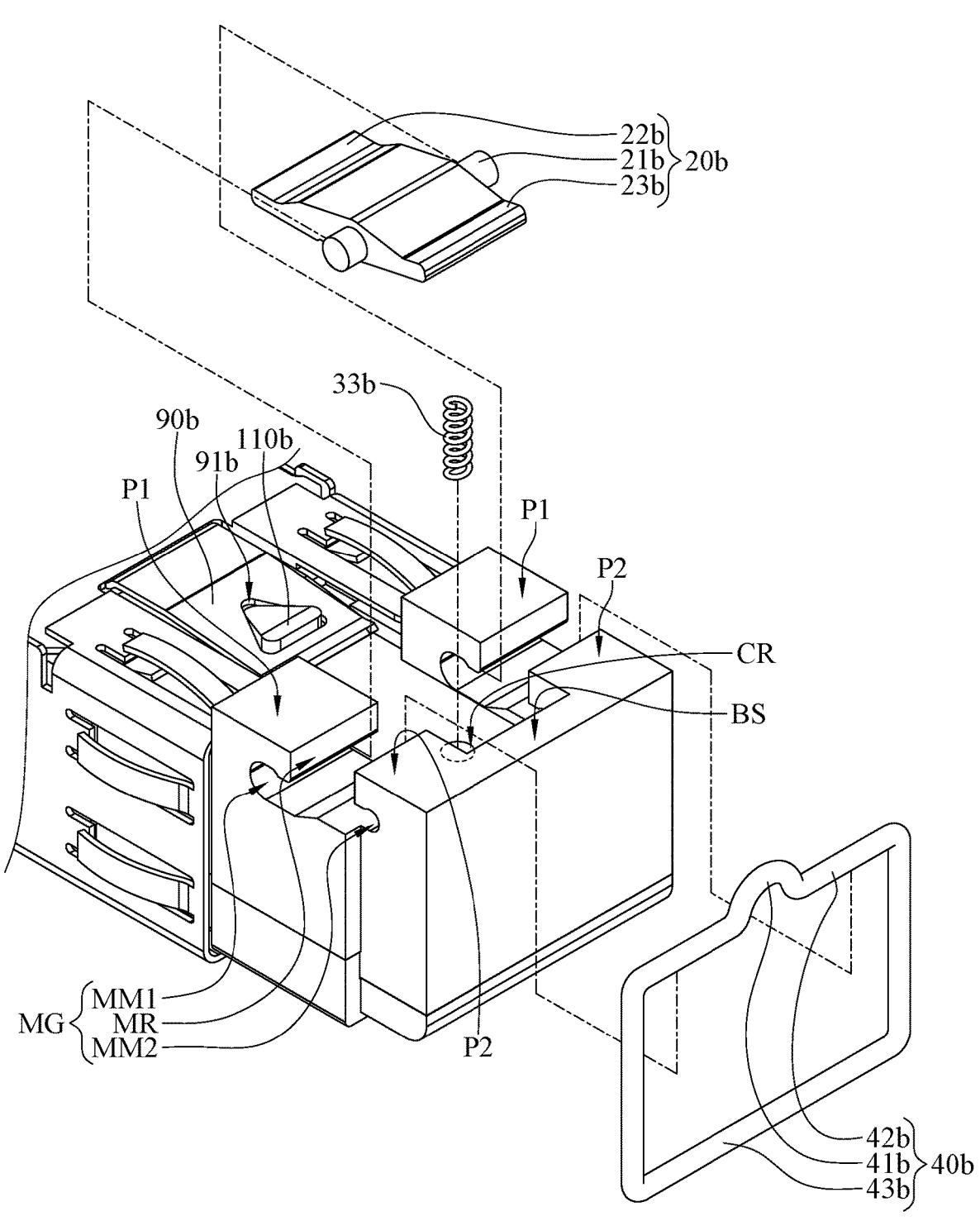
FIG. 9 is a partial and exploded view of the optical transceiver in FIG. 8.
Figure 10:
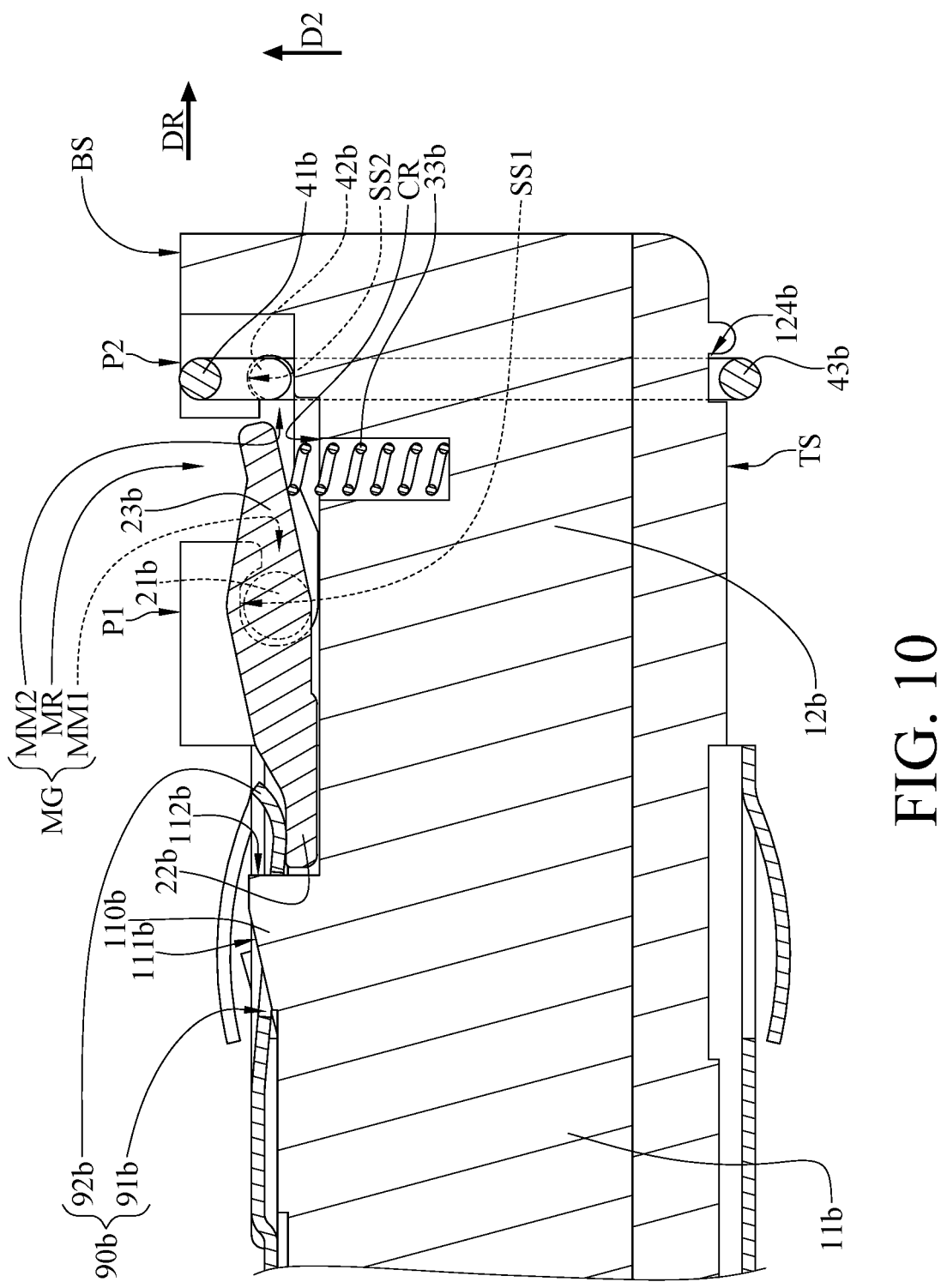
FIG. 10 is a partial cross-sectional view of the optical transceiver in FIG. 8.

Please refer to FIG. 7 to FIG. 10. FIG. 7 is a perspective view of an optical transceiver according to a second embodiment of the present disclosure, FIG. 8 is another perspective view of the optical transceiver in FIG. 7, FIG. 9 is a partial and exploded view of the optical transceiver in FIG. 8, and FIG. 10 is a partial cross-sectional view of the optical transceiver in FIG. 8.

In this embodiment, an optical transceiver $1b$ is provided. The optical transceiver $1b$ is configured to be removably inserted into a cage $9b$. The optical transceiver $1b$ may be an optical transceiver, such as a small form-factor pluggable (SFP) transceiver, a small form-factor pluggable double-density (SFP-DD) transceiver and a dual small form-factor pluggable (DSFP) transceiver. The optical transceiver $1b$ includes a housing $10b$, a seesaw component $20b$, an elastic component $33b$ and a handle $40b$.

The housing $10b$ may include an insertion portion $11b$ and a terminal portion $12b$ connected to each other. In this embodiment, the housing $10b$ may be configured to accommodate optical-electrical converting circuit (not shown in the drawings) and any electrical or optical components required for performing the corresponding optical-electrical conversion.

The insertion portion $11b$ may be configured to be inserted into the cage $9b$ in a pluggable manner. The housing $10b$ may include a first engagement component $110b$, and the first engagement component $110b$ is connected to the terminal portion $12b$. The first engagement component $110b$ may be configured to be detachably engaged with a second engagement component $91b$ of an elastic arm $90b$ of the cage $9b$. In this embodiment, the first engagement component $110b$ of the housing $10b$ may be an engagement protrusion, and the second engagement component $91b$ of the elastic arm $90b$ of the cage $9b$ may be an engagement recess. At the time the optical transceiver $1b$ is inserted into the cage $9b$, an inclined guiding surface $111b$ of the first engagement component $110b$ (for example, engagement protrusion) may contact and pushes a guiding portion $92b$ of the elastic arm $90b$, such that the elastic arm $90b$ deforms and moves in a direction away from the first engagement component $110b$. When the first engagement component $110b$ (for example, the engagement protrusion) corresponds to the second engagement component $91b$ (for example, the engagement recess), the guiding portion $92b$ may be separated from the inclined guiding surface $111b$ and not in contact with the first engagement component $110b$, and the elastic arm $90b$ may move back towards the first engagement component $110b$. As a result, the first engagement component $110b$ may be engaged with the second engagement component $91b$. In addition, when the first engagement component $110b$ is engaged with the second engagement component $91b$, a blocking surface $112b$ of the first engagement component $110b$ may press against a periphery of the second engagement component $91b$ so as to restrict movement of the optical transceiver $1b$ in a release direction DR.

The terminal portion $12b$ of the housing $10b$ may include an engagement groove $124b$, a top surface TS and a bottom surface BS opposite to the top surface TS. The engagement groove $124b$ is located at the top surface TS, and the engagement groove $124b$ may be configured for the handle $40b$ to engage therewith so as to fix the handle $40b$ and restrict rotation of the handle $40b$ relative to the housing $10b$. Before pulling out the optical transceiver $1b$ from the cage $9b$, an operator may firstly disengage the handle $40b$ from the engagement groove $124b$. Detailed operation process of the handle $40b$ will be described later.

The terminal portion $12b$ may include an assembling recess part MG, and the assembling recess part MG may include a release section MR, a first coupling section MM1 and a second coupling section MM2. The release section MR may be recessed from the bottom surface BS, and the first coupling section MM1 and the second coupling section MM2 may be respectively connected to the release section MR. An extension direction of the first coupling section MM1 and an extension direction of the second coupling section MM2 may be different from an extension direction of the release section MR. It is noting that the present disclosure is not limited by the extension direction of the first coupling section MM1 and the extension direction of the second coupling section MM2 being perpendicular to the extension direction of the release section MR. In other implementations, an extension direction of a first coupling section and an extension direction of a second coupling section each may be at an acute angle to an extension direction of a release section.

Figure 12:
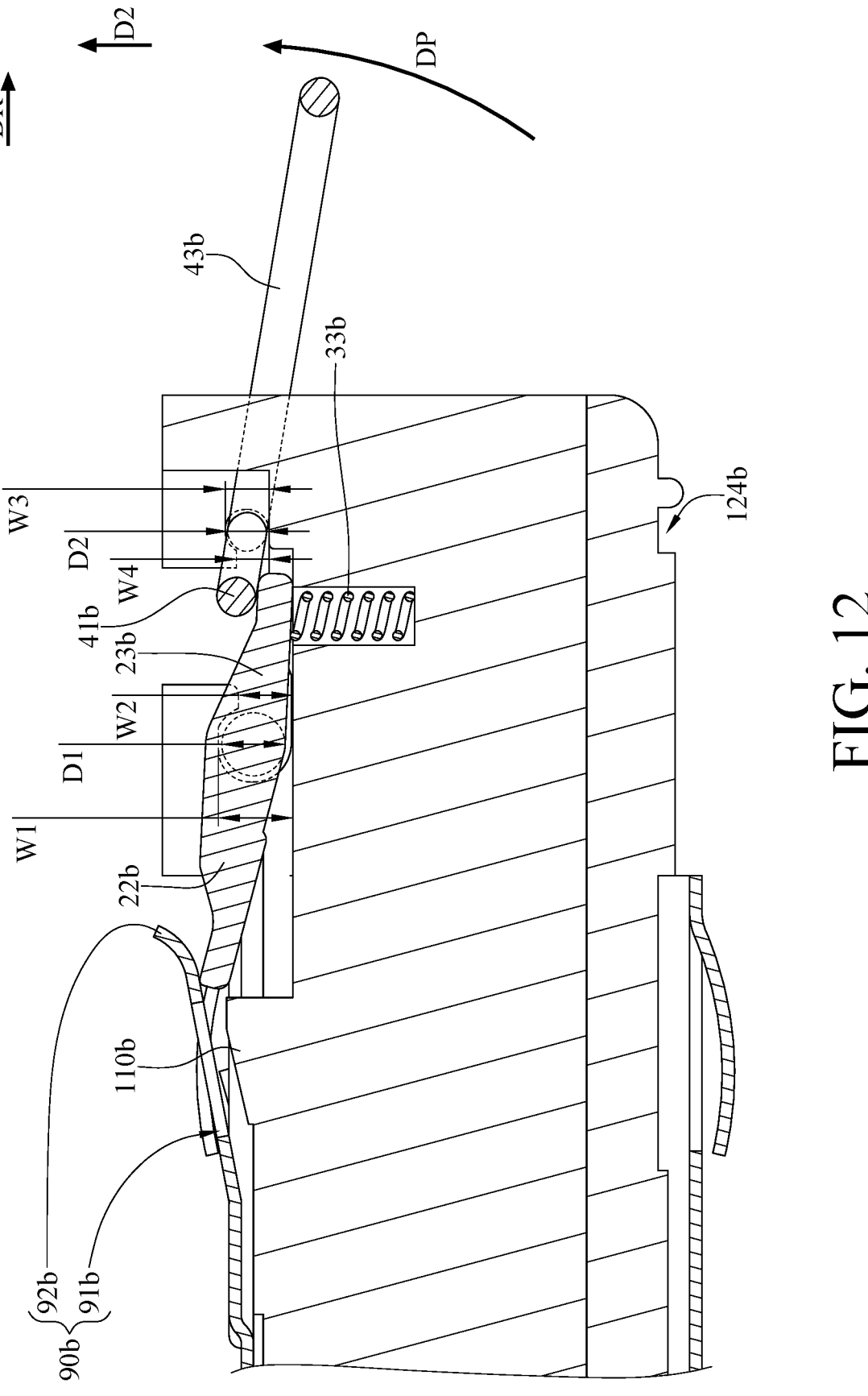
FIG. 12 is a partial cross-sectional view of the optical transceiver in FIG. 8 when a seesaw component of the optical transceiver is located at a release position.

The seesaw component $20b$ may be rotatably disposed on the terminal portion $12b$ of the housing $10b$, and the seesaw component $20b$ may be at either an original position (as shown in FIG. 10) or a release position (as shown in FIG. 12). The seesaw component $20b$ may include a shaft part $21b$, a first arm part $22b$ and a second arm part $23b$. The shaft part $21b$ may be rotatably disposed in the first coupling section MM1 of the assembling recess part MG of the terminal portion $12b$, effectively allowing for the shaft part $21b$ to be rotatably disposed on the terminal portion $12b$ of the housing $10b$. The first arm part $22b$ and the second arm part $23b$ may be respectively connected to opposite sides of the shaft part $21b$.

In this embodiment, the elastic component 33*b* may be a spring. At least a part of the elastic component 33*b* may be located in an accommodation recess CR of the terminal portion 12*b* of the housing 10*b*, and opposite ends of the elastic component 33*b* may be respective in physical contact with an inner bottom surface of the accommodation recess CR and the second arm part 23*b* of the seesaw component 20*b*. The elastic component 33*b* may constantly provide an elastic force on the second arm part 23*b* of the seesaw component 20*b* in a second direction D2 so that the seesaw component 20*b* could be positioned at the original position or moved from the release position to the original position.

Figure 11:
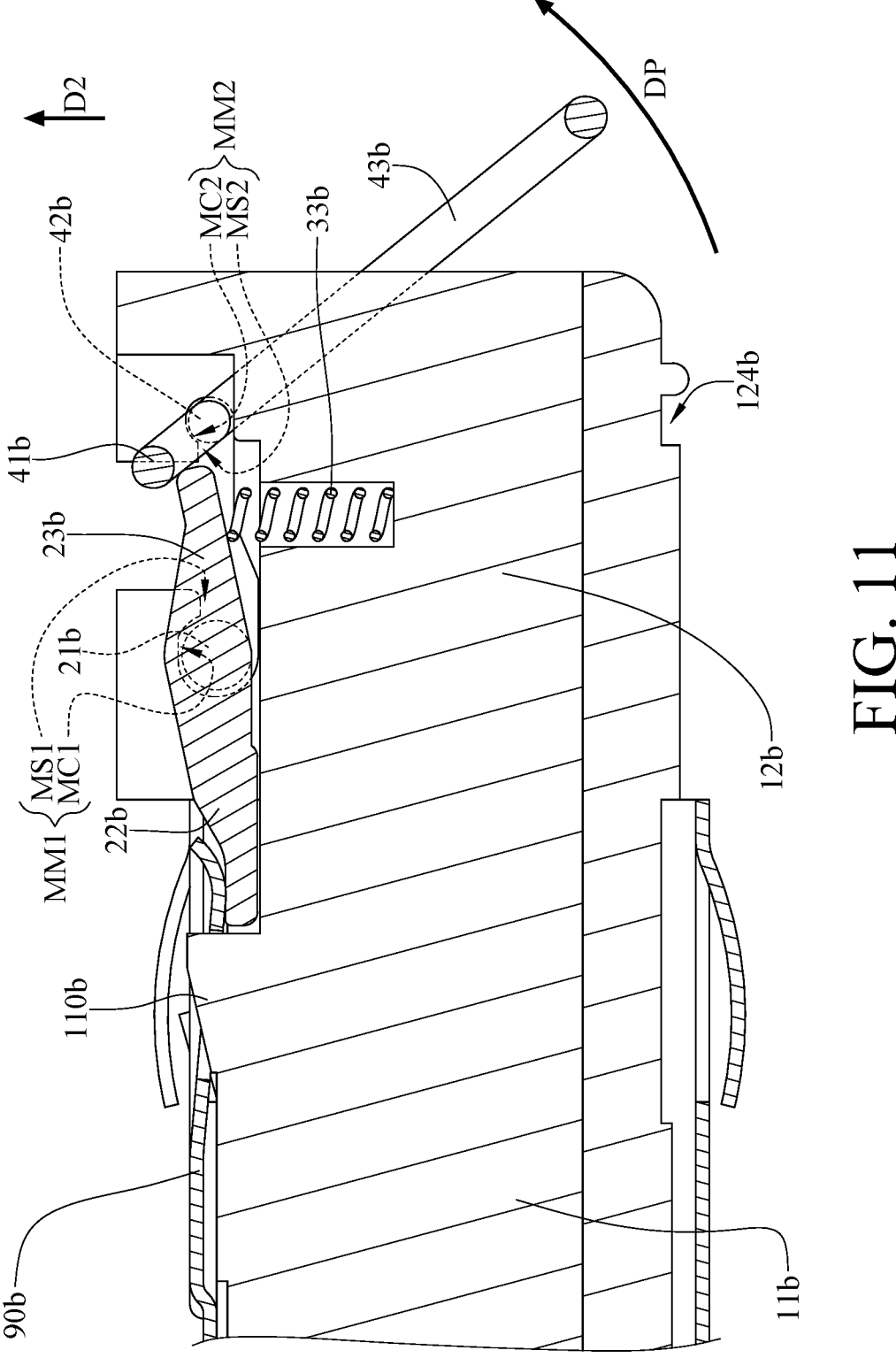
FIG. 11 is a partial cross-sectional view of the optical transceiver in FIG. 8 when an operation part of a handle is separated from an engagement groove of a terminal portion of a housing.

The handle 40*b* may be movably disposed on the terminal portion 12*b* of the housing 10*b*. In this embodiment, the handle 40*b* may include a contact part 41*b*, a rotatably coupling part 42*b* and an operation part 43*b*. The rotatably coupling part 42*b* may be rotatably disposed in the second coupling section MM2 of the assembling recess part MG of the terminal portion 12*b* (as shown in FIG. 11), allowing for the rotatably coupling part 42*b* to be rotatably coupled to the terminal portion 12*b* of the housing 10*b*. The rotatably coupling part 42*b* may be connected to the contact part 41*b* and the operation part 43*b*, both of which may respectively extend toward opposite sides of the rotatably coupling part 42*b* in opposite directions that are perpendicular to an axial direction of the rotatably coupling part 42*b*.

In this embodiment, the seesaw component 20*b* and the handle 40*b* may be fixed in position through a stamping process performed to the housing 10*b*. In specific, please refer to FIG. 8 to FIG. 10. After the shaft part 21*b* of the seesaw component 20*b* and the rotatably coupling part 42*b* of the handle 40*b* respectively pass through the release section MR of the assembling recess part MG and are placed in the first coupling section MM1 and the second coupling section MM2, a punch presses the housing 10*b* at stamping positions P1 and P2 on the bottom surface BS of the terminal portion 12*b* so as to slightly deform the housing 10*b* for restricting the shaft part 21*b* of the seesaw component 20*b* and the rotatably coupling part 42*b* of the handle 40*b* in the first coupling section MM1 and the second coupling section MM2, respectively. In this embodiment, the first coupling section MM1 may include a first blocking surface SS1 facing away from the bottom surface BS and located on one side of the shaft part 21*b* of the seesaw component 20*b* closer to the bottom surface BS. The first blocking surface SS1 is configured to restrict movement of the shaft part 21*b* of the seesaw component 20*b* in a direction parallel to the elastic force (e.g., the second direction D2). The second coupling section MM2 may include a second blocking surface SS2 facing away from the bottom surface BS and located on one side of the rotatably coupling part 42*b* of the handle 40*b* closer to the bottom surface BS. The second blocking surface SS2 is configured to restrict movement of the rotatably coupling part 42*b* of the handle 40*b* in the direction parallel to the elastic force (e.g., the second direction D2).

Please refer to FIG. 11 and FIG. 12. FIG. 11 is a partial cross-sectional view of the optical transceiver in FIG. 8 when an operation part of a handle is separated from an engagement groove of a terminal portion of a housing, and FIG. 12 is a partial cross-sectional view of the optical transceiver in FIG. 8 when a seesaw component of the optical transceiver is located at a release position.

In this embodiment, the first coupling section MM1 may include a first accommodation portion MC1 and a first neck portion MS1 that are connected to each other, and the shaft part 21*b* of the seesaw component 20*b* may be rotatably located in the first accommodation portion MC1. A width W1 of the first accommodation portion MC1 may be larger than a diameter D1 of the shaft part 21*b*, and the diameter D1 of the shaft part 21*b* may be larger than a width W2 of the first neck portion MS1, such that the shaft part 21*b* may be restricted in the first accommodation portion MC1 of the first coupling section MM1. Therefore, by restricting the shaft part 21*b* in the first coupling section MM1 of the assembling recess part MG, the shaft part 21*b* of the seesaw component 20*b* is prevented from moving out of the first coupling section MM1, thereby ensuring normal function of the release mechanism of the optical transceiver 1*b*.

The second coupling section MM2 may include a second accommodation portion MC2 and a second neck portion MS2 that are connected to each other, and the rotatably coupling part 42*b* of the handle 40*b* may be rotatably located in the second accommodation portion MC2 of the second coupling section MM2. A width W3 of the second accommodation portion MC2 may be larger than a diameter D2 of the rotatably coupling part 42*b*, and the diameter D2 of the rotatably coupling part 42*b* may be larger than a width W4 of the second neck portion MS2, such that the rotatably coupling part 42*b* is restricted in the second accommodation portion MC2 of the second coupling section MM2. Therefore, by restricting the rotatably coupling part 42*b* in the second coupling section MM2 of the assembling recess part MG, the rotatably coupling part 42*b* of the handle 40*b* is prevented from moving out of the second coupling section MM2, thereby ensuring normal function of the release mechanism of the optical transceiver 1*b*.

The operator may insert or remove the optical transceiver 1*b* from the cage 9*b* by operating the handle 40*b*. Please refer to FIG. 10 to FIG. 12. When removing the optical transceiver 1*b* from the cage 9*b*, an operator may firstly pull the operation part 43*b* of the handle 40*b* to remove the operation part 43*b* out of the engagement groove 124*b* of the terminal portion 12*b* (as shown in FIG. 11), allowing for the handle 40*b* to have degree of rotational freedom relative to the housing 10*b*. Then, the operator may exert a force on operation part 43*b* in a rotational direction DP so as to rotate the handle 40*b* in the rotational direction DP relative to the housing 10*b* and therefore cause the contact part 41*b* of the handle 40*b* to push the second arm part 23*b* of the seesaw component 20*b* in a direction opposite to the second direction D2, allowing for the movement of the seesaw component 20*b* to the release position (as shown in FIG. 12). During the rotation of the seesaw component 20*b*, the first arm part 22*b* moves in the second direction D2 and pushes the elastic arm 90*b* of the cage 9*b* to move so as to detach the second engagement component 91*b* of the elastic arm 90*b* from the first engagement component 110*b* of the housing 10*b*. As a result, the optical transceiver 1*b* is not engaged with the cage 9*b*. Consequently, the operator may hold the operation part 43*b* and pull the optical transceiver 1*b* out of the cage 9*b* in the release direction DR. After the optical transceiver 1*b* is pulled out of the cage 9*b*, and the operator releases the handle 40*b* (e.g., the operator does not exert a force on the operation part 43*b*), the contact part 41*b* of the handle 40*b* no longer exerts a force on the second arm part 23*b* of the seesaw component 20*b*, such that the second arm part 23*b* is moved in the second direction D2 by an elastic force of the elastic component 33*b*, moving back the seesaw component 20*b* to the original position from the release position.

It is worth noting that the first engagement component 110*b* and the second engagement component 91*b* disclosed in the present disclosure is not limited to a combination of an engagement protrusion with an engagement recess. In other implementations, a first engagement component of a housing may be an engagement recess, and a second engagement component of an elastic arm of a cage may be an engagement protrusion matching the engagement recess.

It is also worth noting that the elastic component 33*b* disclosed in the present disclosure is not limited to a spring. In other implementations, an elastic component may be an elastic plate spring or a torsion spring.

It is further worth noting that the engagement groove 124*b* disclosed in the second embodiment may be optional. In other implementations, a terminal portion of a housing may not include an engagement groove for engaging the handle.

According to the optical transceiver as described in the second embodiment, by directly disposing the seesaw component and the handle into the coupling sections of the assembling recess part of the terminal portion of the housing, the number of components constituting a release mechanism of the optical transceiver can be minimized. As such, the optical transceiver has a relatively simple structure, which is favorable for the reduction of component manufacturing costs and improved assembly efficiency with reduced steps of installation and removal of the components. Furthermore, the seesaw component and the handle of the optical transceiver may be fixed in position through a stamping process performed to the housing. Therefore, the release mechanism of the optical transceiver for detaching from the cage has excellent stability and damage resistance, which is favorable for reducing the possibility of malfunction, thereby increasing manufacturing yield and product quality.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. An optical transceiver configured to be removably inserted into a cage, the optical transceiver comprising:
    a housing comprising a terminal portion and a first engagement component, the first engagement component connected to the terminal portion, and the first engagement component configured to be detachably engaged with a second engagement component of an elastic arm of the cage;
    a release component located in an accommodation space of the terminal portion and at either an original position or a release position, wherein the release component is a seesaw component comprising a shaft part, a first arm part and a second arm part, the shaft part is rotatably coupled to the terminal portion of the housing, and the first arm part and the second arm part are respectively connected to opposite sides of the shaft part;
    a bottom cover comprising a main portion and an elastic component, the main portion fixed to the terminal portion, the elastic component connected to the main portion and extending from the main portion into the accommodation space above the release component, and the elastic component constantly exerting an elastic force on the release component so that the release component is positioned at the original position or moved to the original position; and
    a handle movably disposed on the terminal portion of the housing;

wherein when the handle is driven by an external force to move relative to the terminal portion of the housing, the release component is moved to the release position by the handle pushing the second arm part in a first direction, and thereby the first arm part is moved in a direction opposite to the first direction and pushes the elastic arm of the cage to move so as to detach the second engagement component of the elastic arm from the first engagement component of the housing;

wherein the elastic component exerts elastic force to move the first arm part in the first direction, such that the release component is positioned at or moved to the original position.

2. The optical transceiver according to claim 1, wherein the terminal portion of the housing has a first shaft coupling recess located in the accommodation space, the shaft part of the release component is rotatably disposed in the first shaft coupling recess, the bottom cover further comprises a rib portion, the rib portion is integrally formed with the main portion and protrudes from the main portion towards the accommodation space, and the shaft part is sandwiched between the rib portion and the terminal portion so as to restrict the shaft part in the first shaft coupling recess of the terminal portion.

3. The optical transceiver according to claim 1, wherein the handle is rotatably coupled to the terminal portion of the housing, the handle comprises a contact part, a rotatably coupling part and an operation part, the rotatably coupling part is rotatably coupled to the terminal portion of the housing and connected to the contact part and the operation part, the contact part and the operation part respectively extend toward opposite sides of the rotatably coupling part in opposite directions that are perpendicular to an axial direction of the rotatably coupling part, the contact part is located in the accommodation space, and the operation part sticks out of the terminal portion;

wherein when the operation part of the handle is driven by an external force to move so that the handle rotates relative to the terminal portion of the housing, the contact part of the handle pushes the second arm part in the first direction to move the release component to the release position, such that the first arm part is moved in the direction opposite to the first direction and pushes the elastic arm of the cage to move so as to detach the second engagement component of the elastic arm from the first engagement component of the housing.

4. The optical transceiver according to claim 3, wherein the terminal portion of the housing has a second shaft coupling recess, the rotatably coupling part of the handle is rotatably located in the second shaft coupling recess, and at least a part of the bottom cover covers the rotatably coupling part of the handle so as to restrict the rotatably coupling part in the second shaft coupling recess of the terminal portion.

5. The optical transceiver according to claim 1, wherein one of the first engagement component of the housing and the second engagement component of the elastic arm is an engagement protrusion, and other of the first engagement component and the second engagement component is an engagement recess.

6. The optical transceiver according to claim 5, wherein the first engagement component of the housing is the engagement protrusion, and the second engagement component of the elastic arm of the cage is the engagement recess.

7. The optical transceiver according to claim 6, wherein during an insertion of the optical transceiver into the cage, an inclined guiding surface of the engagement protrusion contacts and pushes a guiding portion of the elastic arm, such that the elastic arm deforms and moves in a direction pointing away from the engagement protrusion; when the engagement protrusion corresponds to the engagement recess, the guiding portion is separated from the inclined guiding surface and the elastic arm moves back in a direction pointing towards the engagement protrusion, such that the engagement protrusion is engaged with the engagement recess, and a blocking surface of the engagement protrusion presses against a periphery of the engagement recess so as to restrict a movement of the optical transceiver in a release direction.

8. The optical transceiver according to claim 1, wherein the main portion of the bottom cover and the elastic component are formed as one piece.

9. The optical transceiver according to claim 1, wherein the housing further comprises engagement protrusions disposed on opposite sides of the terminal portion, the bottom cover further comprises engagement recesses formed on opposite sides of the main portion, the engagement recesses are laterally engaged with the engagement protrusions on the opposite sides of the terminal, respectively, so that the bottom cover is fixed to the housing.

\*  \*  \*  \*  \*